US011051359B2

(12) United States Patent
Starsinic et al.

(10) Patent No.: US 11,051,359 B2
(45) Date of Patent: *Jun. 29, 2021

(54) MANAGING MBMS MEMBERSHIP AT THE SERVICE CAPABILITY EXPOSURE FUNCTION

(71) Applicant: Convida Wireless, LLC, Wilmington, DE (US)

(72) Inventors: Michael F. Starsinic, Newtown, PA (US); Ahmed Mohamed, Pembroke Pines, FL (US); Qing Li, Princeton Junction, NJ (US); Guang Lu, Thornhill (CA)

(73) Assignee: Convida Wireless, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/685,198

(22) Filed: Nov. 15, 2019

(65) Prior Publication Data

US 2020/0128613 A1    Apr. 23, 2020

Related U.S. Application Data

(63) Continuation of application No. 15/562,564, filed as application No. PCT/US2016/025487 on Apr. 1, 2016, now Pat. No. 10,517,138.

(Continued)

(51) Int. Cl.
*H04W 4/06* (2009.01)
*H04W 76/40* (2018.01)
(Continued)

(52) U.S. Cl.
CPC ....... *H04W 76/40* (2018.02); *H04L 29/06027* (2013.01); *H04L 67/1046* (2013.01);
(Continued)

(58) Field of Classification Search
CPC ......... H04W 76/40; H04W 4/08; H04W 4/06; H04W 80/04; H04L 67/1046; H04L 67/02; H04L 29/0627
See application file for complete search history.

(56) References Cited

U.S. PATENT DOCUMENTS 9,712,542 B1    7/2017  Brandwine
2013/0294321 A1   11/2013  Wang et al.
(Continued)

FOREIGN PATENT DOCUMENTS

CN    102378118 A    3/2012
CN    103517415 A    1/2014
(Continued)

OTHER PUBLICATIONS

3GPP TR 23.769 v1.1.0(Feb. 2015) (Year: 2015).*
(Continued)

*Primary Examiner* — Phong La
(74) *Attorney, Agent, or Firm* — BakerHostetler

(57) ABSTRACT

The present application is directed to an apparatus on a network including a non-transitory memory having executable instructions for configuring membership of a group, and a processor that is operably coupled to the non-transitory memory. The processor is configured to receive a request from a server to add a device to the group, to send a reply to the server that the device is authorized to join the group, to deliver a message to the device when a predetermined condition is met. The device status is selected from joined, active, authorized and combinations thereof. The predetermined condition is selected from a percentage or number of devices in the group are listening, a set time has elapsed, and combinations thereof. The present application is also directed to a networked system including a server and an apparatus in communication with the server.

13 Claims, 13 Drawing Sheets

Related U.S. Application Data

(60) Provisional application No. 62/142,156, filed on Apr. 2, 2015.

(51) Int. Cl.
| | | |
|---|---|---|
| *H04W 4/08* | (2009.01) | |
| *H04L 29/08* | (2006.01) | |
| *H04L 29/06* | (2006.01) | |
| *H04W 80/04* | (2009.01) | |

(52) U.S. Cl.
CPC ............... *H04W 4/06* (2013.01); *H04W 4/08* (2013.01); *H04L 67/02* (2013.01); *H04W 80/04* (2013.01)

(56) References Cited

U.S. PATENT DOCUMENTS

| | | | |
|---|---|---|---|
| 2015/0244602 A1* | 8/2015 | Hasha | H04L 43/0876 |
| | | | 709/224 |
| 2016/0227385 A1* | 8/2016 | Ahmad | H04W 76/19 |
| 2016/0283740 A1 | 9/2016 | Roundtree | |
| 2017/0142741 A1 | 5/2017 | Kaur et al. | |
| 2017/0244794 A1 | 8/2017 | Dain et al. | |
| 2017/0251342 A1 | 8/2017 | Bhalla | |
| 2018/0092016 A1 | 3/2018 | Kim et al. | |
| 2018/0092133 A1 | 3/2018 | Starsinic et al. | |
| 2018/0270891 A1 | 9/2018 | Kim et al. | |

FOREIGN PATENT DOCUMENTS

| | | |
|---|---|---|
| JP | 2012-182587 A | 9/2012 |
| JP | 2018-515007 A | 6/2018 |
| KR | 10-2011-0095948 A | 8/2011 |
| WO | 2014/046686 A1 | 3/2014 |
| WO | 2014/049418 A1 | 4/2014 |
| WO | 2014/059582 A1 | 4/2014 |
| WO | 2015/200801 A1 | 12/2015 |
| WO | 2016/007494 A1 | 1/2016 |
| WO | 2016/161242 A1 | 10/2016 |

OTHER PUBLICATIONS

3GPP TS 23.682 V11.4.0 3rd Generation Partnership Project; Technical Specification Group Services and System Aspects; Architecture enhancements to facilitate communications with packet data networks and applications (Release11), Jun. 2013, 29 pages.

3rd Generation Partnership Project (3GPP) TR 23.708 V1.1.0, Technical Specification Group Services and System Aspect; Architecture Enhancements for Service Capability Exposure (Release 13), Feb. 2015, 27 pages.

3rd Generation Partnership Project (3GPP) TR23.769 V1.1.0, "Technical Specification Group Services and System Aspects; Group based Enhancements (Release 13)", France, Mar. 3, 2015, 39 pages.

3rd Generation Partnership Project (3GPP) TS 23.246 V13.0.0, Technical Specification Group Services and Systems Aspects; Multimedia Broadcast/Multicast Service (MBMS); Architecture and Functional Description (Release 13), Mar. 2015, 68 pages.

3rd Generation Partnership Project (3GPP) TS 23.401 V12.8.0, Technical Specification Group Services and System Aspects; General Packet Radio Service (GPRS) Enhancements for Evolved Universal Terrestrial Radio Access Network (E-UTRAN) Access (Release 12), Mar. 2015, 308 pages.

3rd Generation Partnership Project (3GPP) TS 23.468 V13.0.0, Technical Specification Group Services and System Aspects; Group Communication System Enablers for LTE (GCSE_LTE); Stage 2 (Release 13), Mar. 2015, 28 pages.

3rd Generation Partnership Project (3GPP) TS23.682 V11.4.0; Digital Cellular Telecommunications System (Phase2+) Universal Mobile Telecommunications System (UMTS: LTE: Architecture Enhancements to Facilitate Communications with Packet Data Networks and Applications Jun. 2013, 31 pages.

Alcatel-Lucent et al., "Groupe PCR-Corrections to MBMS Solution" SA WG2 Meeting @105-S2-144405, Nov. 2014, 5 pages.

ETSITS 123 682, Jun. 1, 2013 (Jun. 1, 2013), pp. 1-31.

IETF RFC 3376, Internet Group Management Protocol, Version 3, Oct. 2002, 54 pages.

IETF RFC 3810, Multicast Listener Discovery Version 2 (MLDv2) for IPv6, Aug. 13, 2016, 36 pages.

\* cited by examiner

MANAGING MBMS MEMBERSHIP AT THE SERVICE CAPABILITY EXPOSURE FUNCTION

CROSS-REFERENCE TO RELATED APPLICATIONS

This application is a continuation of Ser. No. 15/562,564 filed Sep. 28, 2017 which is the National Stage Application filed under 35 U.S.C. § 371 of International Application No. PCT/US2016/025487 filed Apr. 1, 2016 which claims priority to U.S. Provisional Application No. 62/142,156, filed Apr. 2, 2015, the disclosures of which are incorporated herein by reference in their entirety.

FIELD OF THE INVENTION

The present application relates to apparatuses and methods for tracking devices in a group on behalf of a server. The present application also relates to apparatuses and method for determining active devices in a group on behalf of a server.

BACKGROUND

Generally, a service capability exposure function (SCEF) is requested by a server, such as a service capability server (SCS) or an application server (AS), to add a device or user equipment (UE) to the multicast group. While the device or UE may be in contact with a mobile network operator, an application on the device does not know it is a member of a multicast group. To accommodate this, two approaches typically are employed. In one approach, a server may unicast a message to each device informing it of the multicast group. The unicast message may carry details of the multimedia broadcast multicast service (MBMS). In another approach, the device may contact the SCEF over the user plane to learn details on the group including, for example, the multi-cast address and temporary mobile group identity (TMGI). However, the device does not know when it should contact the SCEF and query for this information.

Complications nevertheless exist with the two approaches stated above. For instance, when the SCS/AS requests the SCEF to add a member to the group, the SCEF presumes that the device has joined the group. This may not be accurate especially if the device's policies and capabilities do not match with those required by the server. This may occur in instances when the device decides not to join the group or delay joining the group. Separately, while the device may have joined the group, it may still not be activated. That is, the device is not listening to multicast messages from the server.

The approaches discussed above require the server to see the underlying transport details of the MBMS to the device. Specifically, the device assumes that that the SC S/AS knows about the specific details of the MBMS device context, e.g., Multicast Address, TMGI, etc. Meanwhile, the SC S/AS assumes there is an application on the device that listens for the unicast message from the SCS/AS to join the MBMS group. The transport details stray from the desired objective of hiding the underlying group delivery and transport details from the server.

SUMMARY

This Summary is provided to introduce a selection of concepts in a simplified form that are further described below in the Detailed Description. This Summary is not intended to limit the scope of the claimed subject matter. The foregoing needs are met, to a great extent, by the present application directed to a process and system for managing membership of devices on a network.

In one aspect of the application, there is described a computer-implemented apparatus on a network. The apparatus comprises a non-transitory memory including executable instructions for configuring membership of a group. The apparatus also includes a processor that is operably coupled to the memory. The processor is configured to receive a request from a server to add a device to the group. The processor is also configured to send a reply to the server that the device is authorized to join the group. The processor is further configured to receive a query request from the server. Further, the processor checks the status of the device based on the query request.

In another aspect of the application, there is described a networked system including a server. The system also includes an apparatus in communication with the server. The apparatus includes a non-transitory memory including executable instructions for configuring membership of a group. The apparatus also includes a processor that is operably coupled to the memory. The processor is configured to receive a request from a server to add a device to the group. The processor is also configured to send a reply to the server that the device is authorized to join the group. The processor is further configured to receive a query request from the server. Further, the processor checks the status of the device based on the query request.

In yet even another aspect of the application, a computer-implemented method for configuring membership of a group is described. The method includes a step of receiving a request from a server to add a device to the group. The method also includes a step of sending a reply to the server that the device is authorized to join the group. The method further includes a step of receiving a query request from the server. The method even further includes a step of checking the status of the device based on the query request. The method yet even further includes a step of sending the status of the device to the server.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
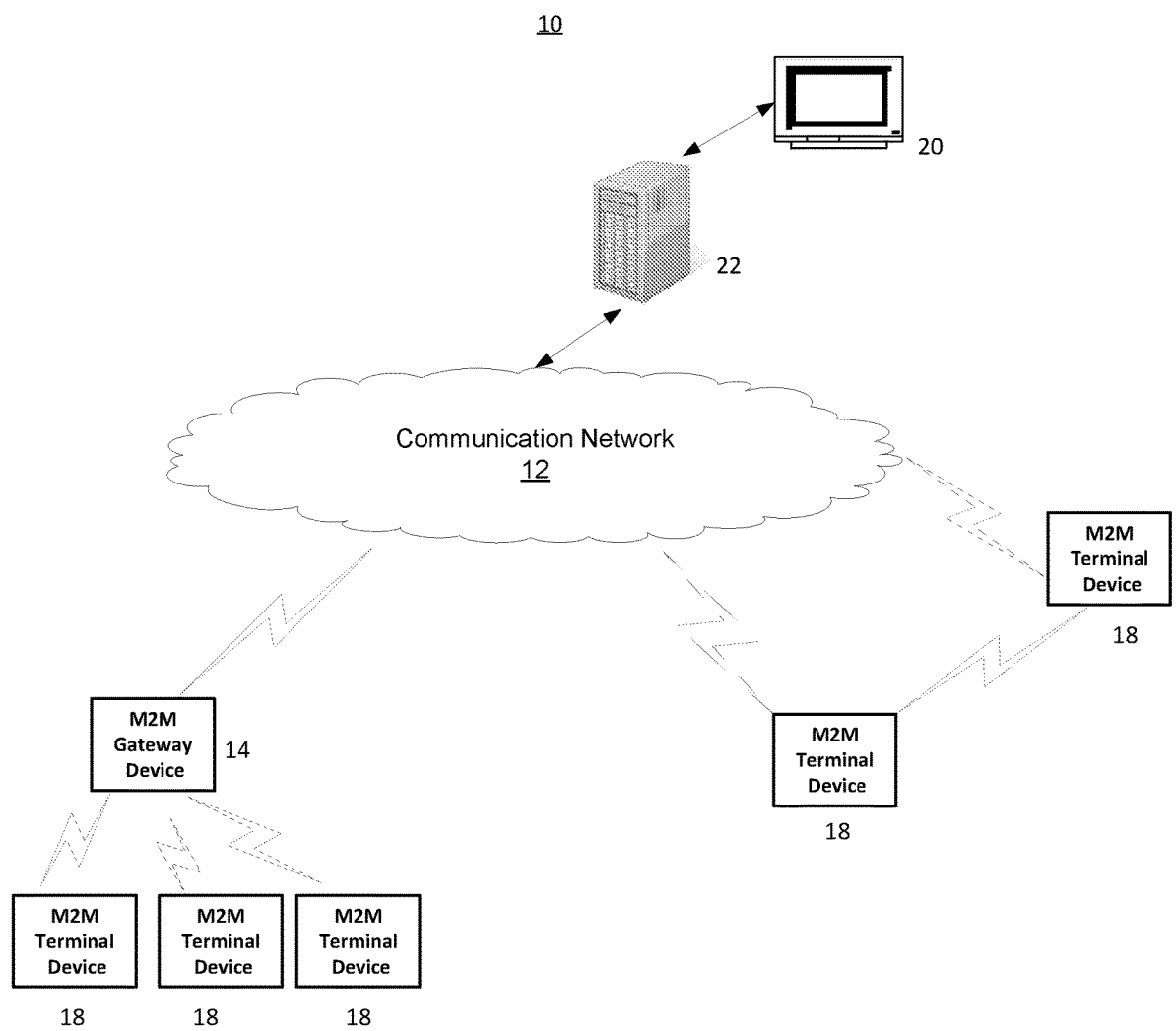
FIG. 1A illustrates an embodiment of a machine-to machine (M2M) or IoT communication system.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The present application describes novel techniques and systems for adding or updating devices to a group. By doing so, the SCS/AS and SCEF may distinguish between devices that have been authorized to join the group and are active, e.g., listening, from devices that have been authorized to join the group yet are not activate, e.g., not listening. In particular, the SCS/AS can inquire upon the SCEF whether one or more devices have activated the MBMS service to listen to the multicast.

Another embodiment preferably describes architecture and protocols in which the underlying transport details, e.g., MBMS transport details, are hidden from the SCS/AS. By so doing, the SCS/AS may run more efficiently because the task of selecting how or when data will be delivered to group members will be handled by the SCEF. In one embodiment, the SCEF may employ a trigger or another initiating mechanism for authorized devices by sending a request to the device to activate the MBMS Service and begin listening to the multicast address from the server. In an exemplary embodiment, the trigger may be a service advertisement.

Acronyms

The following acronyms will be used throughout the application as provided in Table 1 below.

TABLE 1

| Term | Acronym |
| --- | --- |
| AESE | Architecture Enhancements for Service Capability Exposure |

TABLE 1-continued

| Term | Acronym |
| --- | --- |
| AS | Application Server |
| BM-SC | Broadcast Multicast Service Center |
| GGSN | Gateway GPRS Support Node |
| GPRS | General Packet Radio Service |
| HSS | Home Subscriber Server |
| IGMP | Internet Group Management Protocol |
| MBMS | Multimedia Broadcast Multicast Service |
| P-GW | Packet Data Network Gateway |
| SCS | Service Capability Server |
| SCEF | Service Capability Exposure Function |
| SGSN | Serving GPRS Support Node |
| S-GW | Serving Gateway |
| TGMI | Temporary Mobile Group Identity |
| UDP | User Datagram Protocol |

The following terms will be used throughout the application consistent with their customary and ordinary definitions as understood in the art are provided below unless otherwise explicitly mentioned:

Platforms

This application is intended to cover platform functionality and support for both application enablement platforms (AEPs) and connected device platforms (CDPs). AEPs include an application enablement layer and a service layer including the World Wide Web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14, such as a SCS with a proxy, and terminal devices 18, such as UE devices. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. In one embodiment, the service layer 22 may be a service capability server or an application server. M2M devices 18 and gateways 14 may communicate via various networks including, cellular, WLAN, WPAN, e.g., Zigbee, 6LoWPAN, Bluetooth, direct radio link, and wireline for example.

Figure 1B:
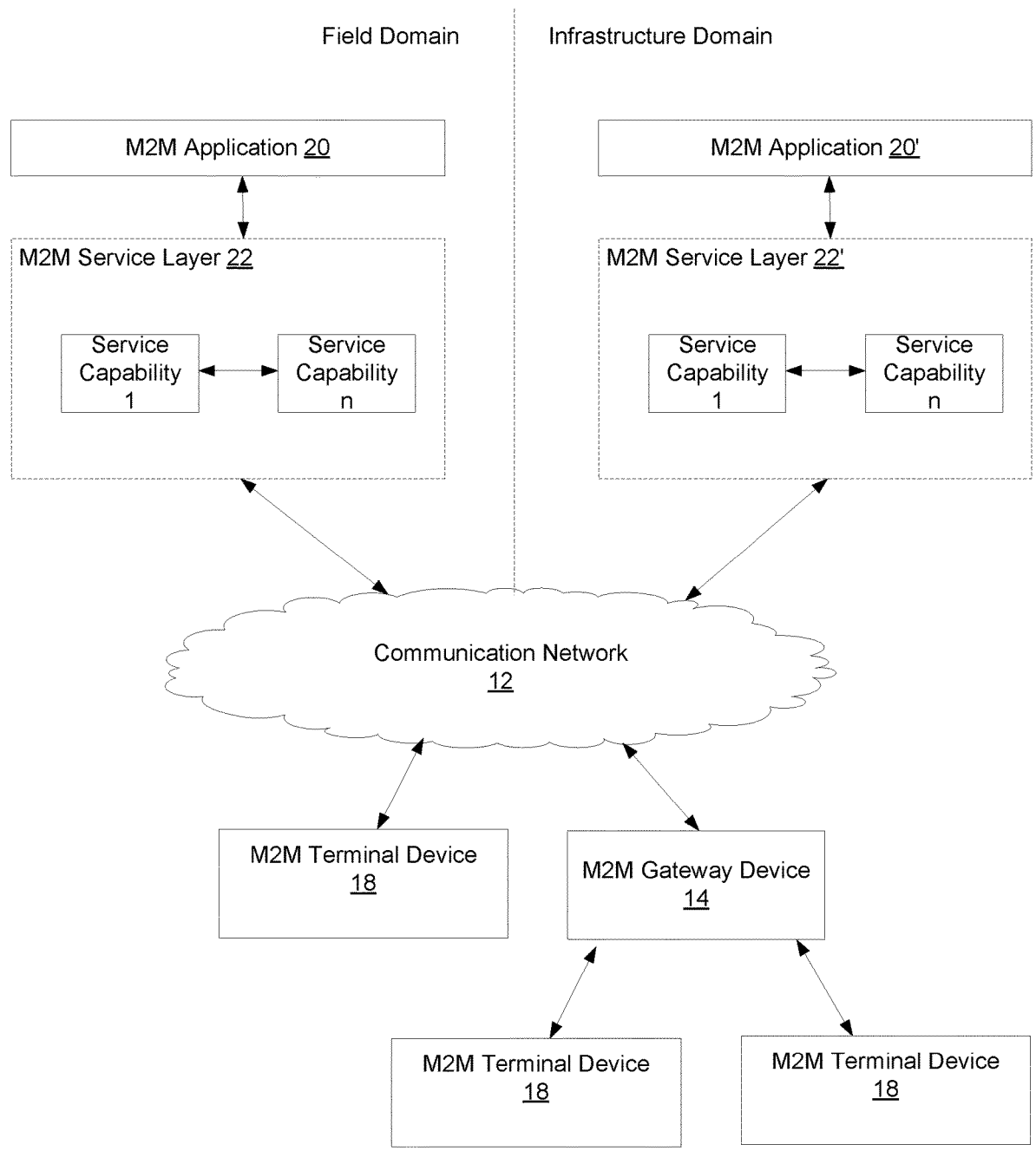
FIG. 1B illustrates an embodiment of the application of a M2M service platform.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as UEs, SCSs and MMES as discussed in this application and illustrated in the figures.

The service layer is a software middleware layer that supports value-added service capabilities through a set of Application Programming Interfaces (APIs) and underlying networking interfaces. Both ETSI M2M and oneM2M use a service layer that may contain this method of controlling and coordinating UEs PSM mode. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE), such as a SCS which may be hosted on different types of network nodes, e.g., infrastructure node, middle node, application-specific node. Further, the methods described in the present application can be implemented as part of an M2M network that uses a Service Oriented Architecture (SOA) and/or a Resource Oriented Architecture (ROA).

Figure 1C:
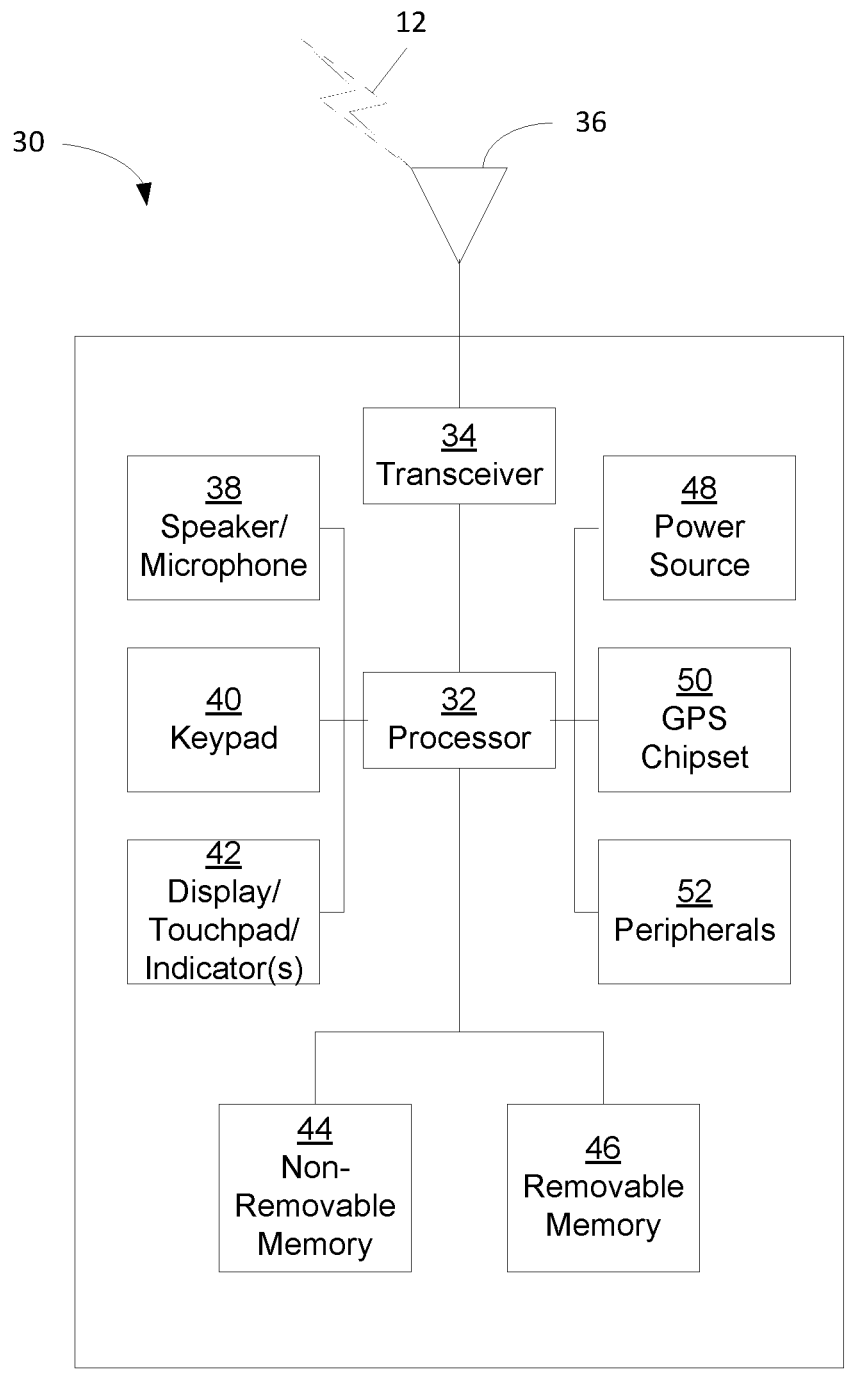
FIG. 1C illustrates an embodiment of the application of a system diagram of an example M2M device.

FIG. 1C is a system diagram of an example M2M device 30, such as a M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. The display 42 may also include a graphical user interface (GUI) displaying requests for user equipment. This is shown, for example, in FIG. 11. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices, including for example UEs, routers, gateways, and servers as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
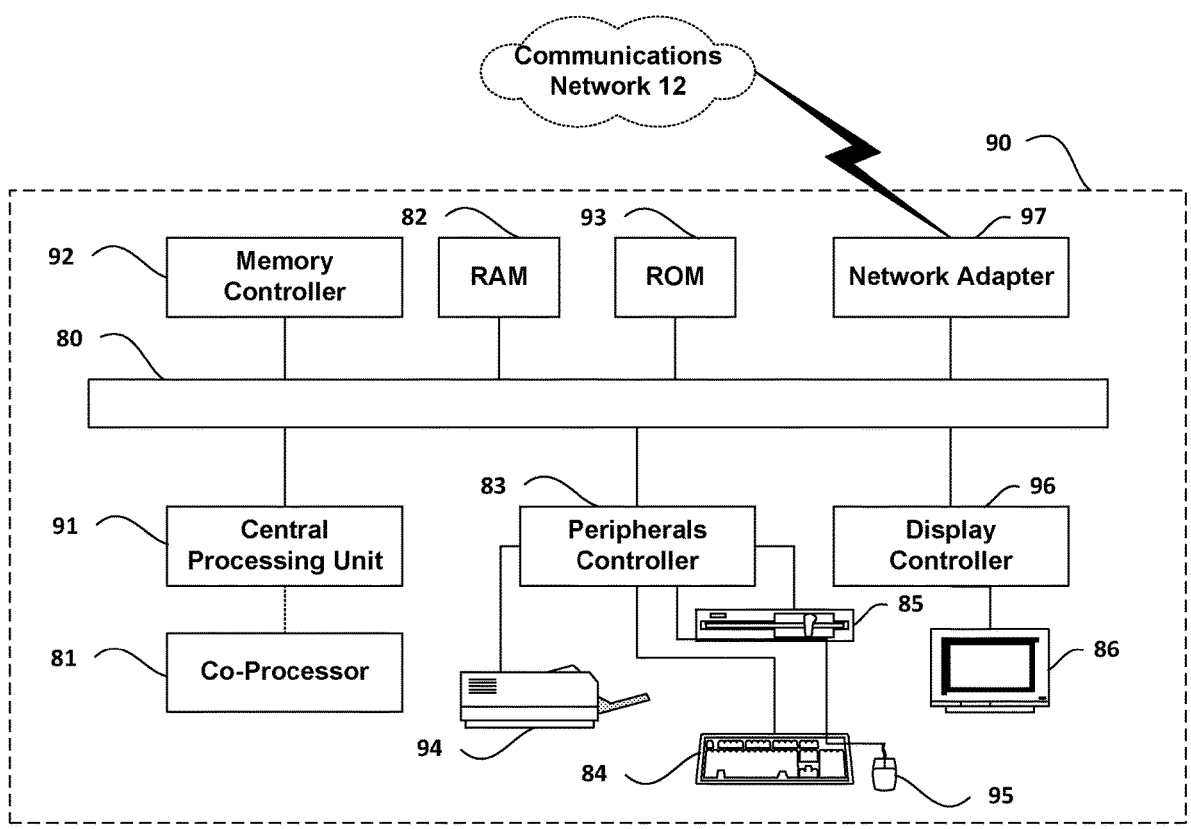
FIG. 1D illustrates an embodiment of the application of a block diagram of an exemplary computing system.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. The display 86 may also display a graphical user interface, such as shown, for example, in FIG. 11. Further, computing system 90 may contain network adaptor 97 that may be used to connect computing system 90 to an external communications network, such as network 12 of FIG. 1A and FIG. 1B.

General IP Multicast (IPv4 and IPv6)

According to another embodiment, an IP multicast address allows a single sender to send the same data to multiple listeners. The sender, such as for example, the SCS/AS or the SCEF, sends the data to a multicast IP address and the listeners are all receiving on the same multicast address. One feature of the IP Multicast Group is that addresses can be shared. Another feature is that many sources can send information to the same address. In an exemplary embodiment, streams or channels can be multiplexed with different UDP port numbers and each multicast listener can extract the information they desire.

Internet Group Management Protocol (IGMP)

IGMP is defined in IETF FC 3376, Internet Group Management Protocol, Version 3, and incorporated by reference. Generally, the IGMP is a communication protocol used by hosts and adjacent routers on IP networks to establish multicast group memberships. It is used in IPv4 systems to report their IP multicast membership to neighboring routers. Systems that support IGMP expose an API to applications that allow applications to tell the system which multicast-address or addresses it wishes to listen to, and on which network interfaces, e.g., cellular, Wi-Fi, Ethernet, etc.

In addition, IGMP supports source filtering. This is the ability for a system to report interest in receiving packets 'only' from specific source addresses, or from 'all but' specific source addresses, sent to a particular multicast address. When an application on a device indicates what multicast address it wants to listen to, the device can also specify the filter.

Moreover, there are two important types of IGMP messages—Membership Reports and Membership Queries. Membership reports are used by IP systems to report to neighboring routers what multicast groups they are interested in. Membership Queries are sent by IP multicast routers to query the multicast reception state of neighboring interfaces. Three types of Query messages are employed. The first type is a general query whereby a query is sent by a router to learn the complete multicast reception state on all of its neighboring interfaces. In other words, to learn which multicast messages should be sent on each interface. A second type is a group specific query whereby a query is sent by a router to learn the reception state with respect to a specific multicast group. A third, group and source specific query, is sent by a router to learn if any neighboring interface desires to receive packets sent to a specific group by a specific list of sources.

Multicast Listener Discovery (MLD)

MLD is defined in IETF RFC 3810, Multicast Listener Discover Version 2 (MLDv2) and is incorporated herein for IPv6. MLD is a component of IPv6 and used by routers for discovering multicast listeners on a directly attached link. The protocol is embedded in ICMPv6 instead of using a separate protocol. In addition, MLD is used in IPv6 systems to report their IP multicast membership to neighboring routers. Given MLD's similarity to IGMP, any references to IGMP also apply to MLD.

Multimedia Broadcast Multicast Service (MBMS)

Figure 2:
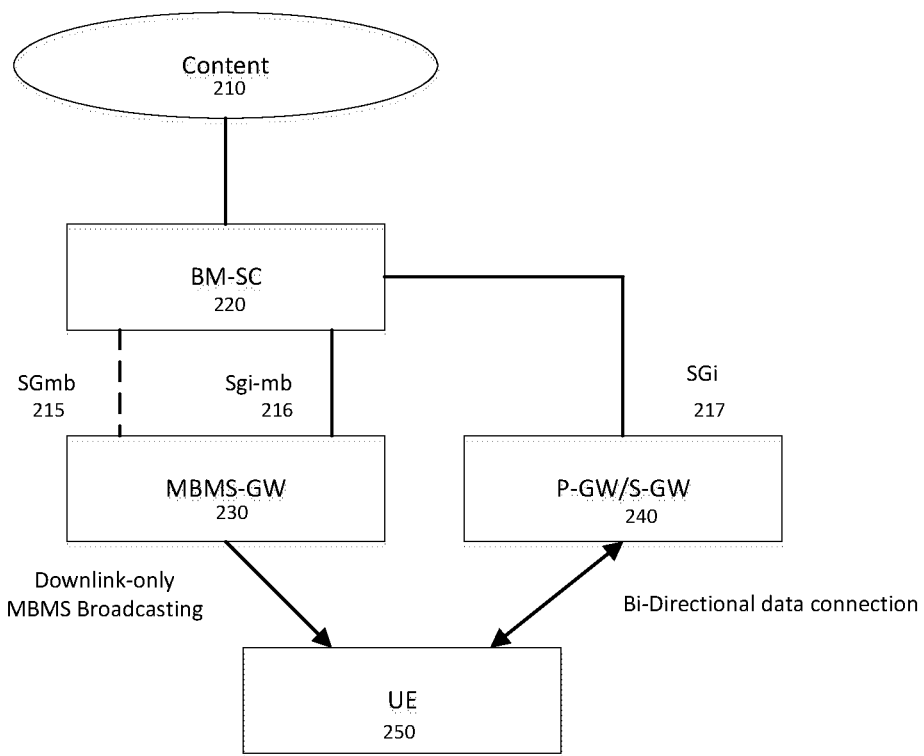
FIG. 2 illustrates a BM-SC connection to the mobile network infrastructure according to the application.

The MBMS service is defined in 3GPP TS 23.246 Multimedia Broadcast/Multicast Service; Architecture and Functional Description and is incorporated herein. A high level view of the MBMB Architecture is shown in FIG. 2 and can also be found in EPC and 4G Packet Networks, by Magnus Olsson et al., Academic Press, 2013 which is incorporated in its entirety. As shown in FIG. 2, content 210 is provided to the BM-SC 220. The content is sent via lines SGmb 215 or 2gi-mb 216 to the MBMS-GW 230. Alternatively, content is sent through line SGi 217 to P-GW/S-GW 240. Communications leading to the UE or device 250 from the MBMS-GW 225 is described as Downlink-only MBMS Broadcasting. Meanwhile, communication to the UE 250 from the P-GW/S-GW 240 is described as a bi-directional data connection.

Figure 3:
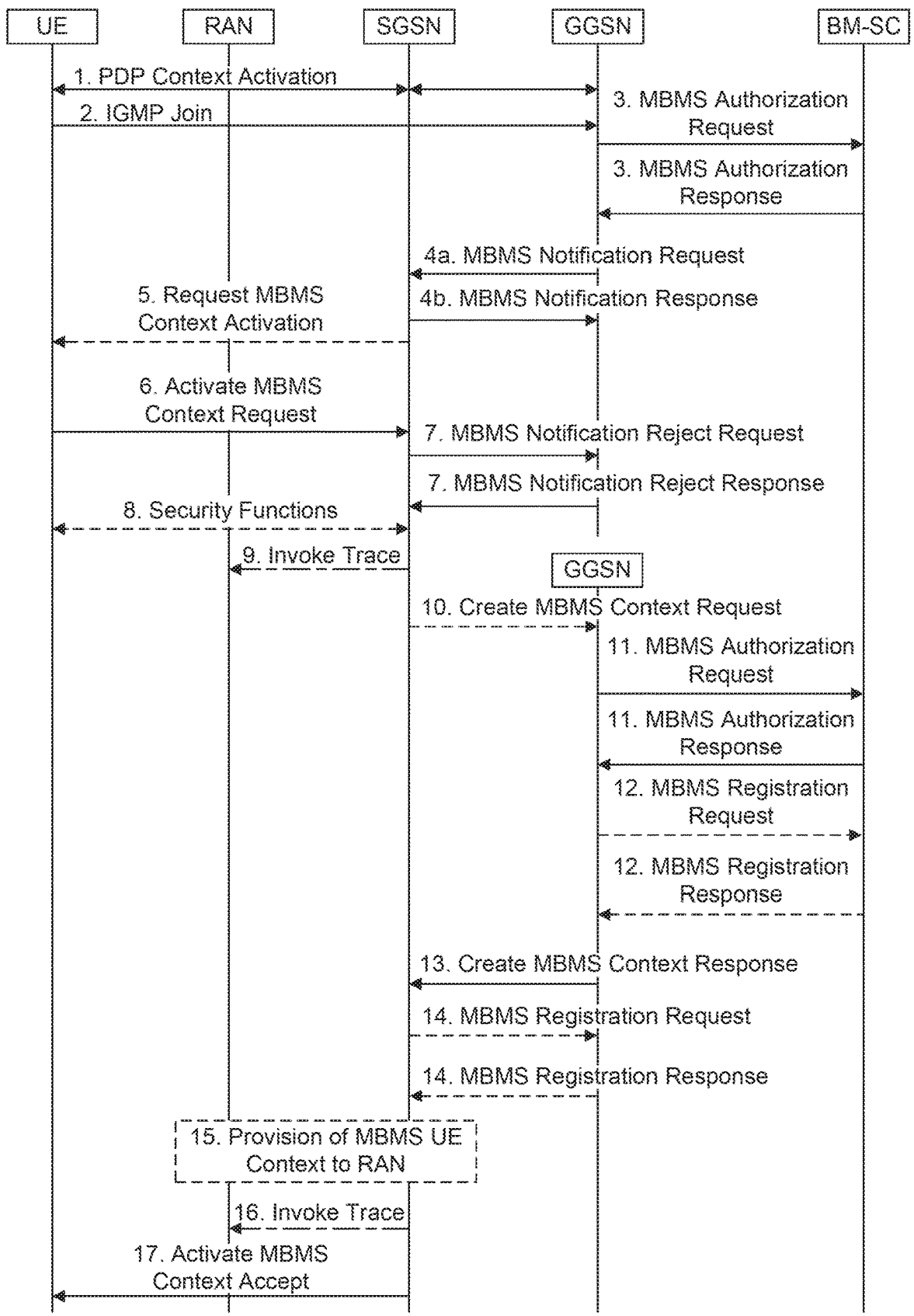
FIG. 3 illustrates a protocol for activating a MBMS multicast service according to the application.

The BM-SC is the node that controls MBMS Sessions. It initiates notifications that the MBMS will be used to broadcast specific content and it manages functionality associated with terminals that want to join sessions. All interactions between the terminals and the BM-SC are handled over unicast. Generally, the MBMS service is user aware. That is, sessions are controlled on a per-user basis. The main functions of the BM-SC include at least the following: (i) Service Announcement Function; (ii) Key Management Function; and (iii) Session and Transmission Function The protocols for how UEs activate the MBMS are illustrated, for example, in FIG. 3. Each of the steps is denoted by a Roman numeral. In particular, step 1 describes how the UE activates its default PDN context with the SGSN and GGSN. In step 2, the UE attempts to join the MBMS service. The decision to join the group may be in response to a service advertisement (now shown). The advertisement may be sent via a protocol including but not limited to WAP push and SMS. Steps 3-17 describe the activation process for the MBMS. In particular, step 3 describes the authorization request and response between the GGSN and the BM-SC. In step 4, the MBMB notification request is sent from the GGSN to the SGSN and a response is received in view thereof. In step 5, the SGSN sends a request for MBMS Context activation to the UE. In step 6, the UE accepts by activating the MBMS context request and information the SGSN. In Step 7, the SGSN may send a notification reject request to the GGSN and a response is sent back to the SGSN. According to step 8, security functions are transmitted between the UE and SGSN. In step 9, a trace is invoked between the SGSN and RAN. In step 10, SGSN creates a MGMS context request. Step 11 involves a MBMS Authorization Request and response between the GGSN and BM-SC (see step 3 above). In step 12, a MBMS registration request and response is transmitted between the GGSN and the BMSC. Step 13 involves creating a MBMS context response sent from the GGSN to the SGSN. Thereafter, a MBMS registration request may be sent from the SGSN to the GGSN and a response thereto according to step 14. Step 15 involves provisioning MBMS UE Context to RAN. A trace may be invoked in step 16. Finally, the UE activates the MBMS context accept protocol (step 17).

SA2 AESE TR and SCEF

Figure 4:
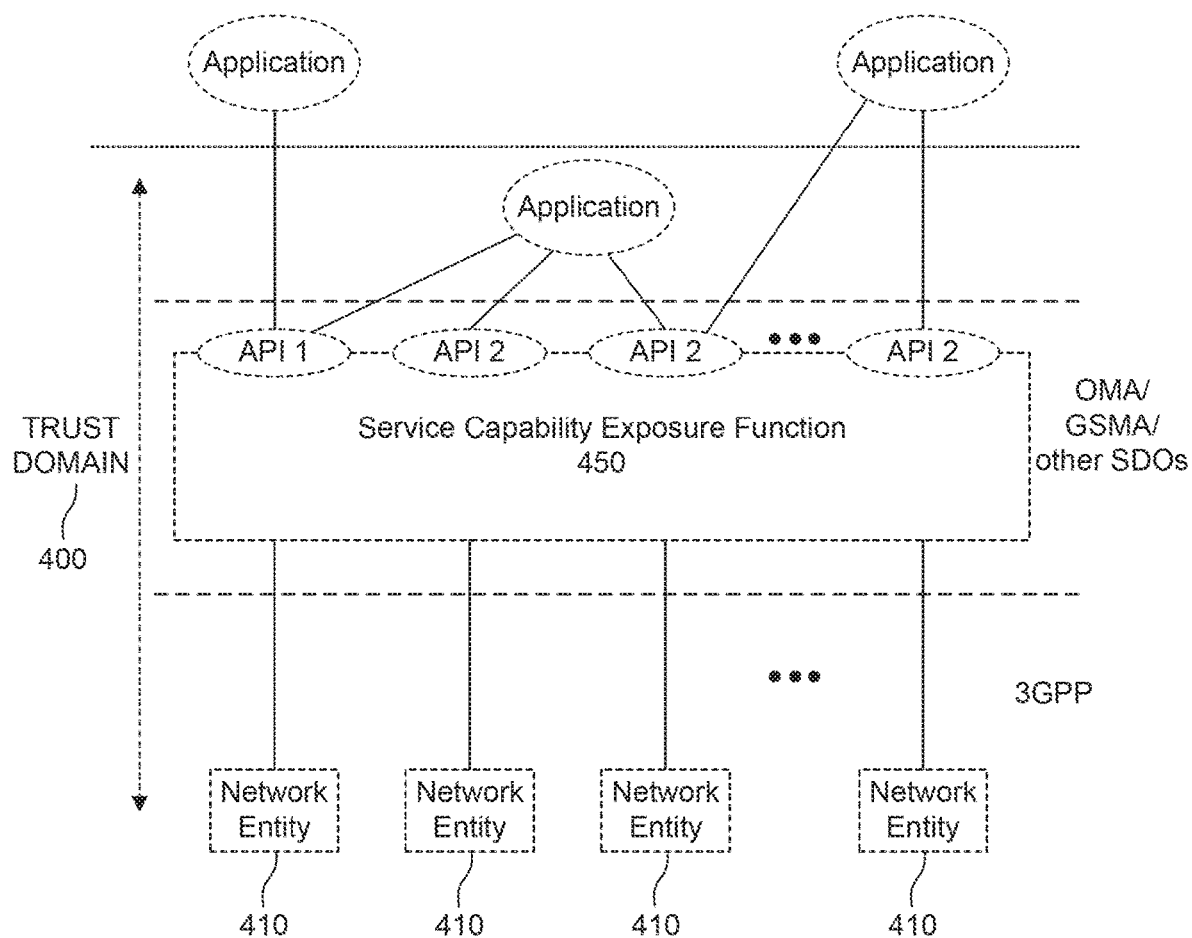
FIG. 4 illustrates service capability exposure architecture according to the application.

SA2 AESE TR is addressed in 3GPP TR 23.708, *Architecture Enhancements for Service Exposure*, which is incorporated by reference in its entirety. This architecture addresses issues with the service capability exposure framework (SCEF). The exposure of services by the network creates a "toolbox" of capabilities that, with proper authorization, may be used to retrieve information, to request specific services, to receive notifications, to request the setting of specific parameters, etc. FIG. 4 illustrates the general architecture for a SCEF. The illustration in FIG. 4 depicts a SCEF 450 within a trust domain 400. The trust domain 400 covers entities 410 that are protected by adequate network domain security. The entities and interfaces within the trust domain 400 may all be within one mobile operator's control. Alternatively, the entities may be controlled by a trusted business partner having a relationship with the mobile operator. The business partner may be another operator or a third party.

The SCEF provides a means to securely expose the services and capabilities provided by 3GPP network interfaces. The SCEF provides a means for the discovery of the exposed service capabilities. The SCEF provides access to network capabilities through homogenous network application programming interfaces, e.g., Network API 430, defined by OMA, GSMA, and possibly other standardization bodies. The SCEF abstracts the services from the underlying 3GPP network interfaces and protocols.

According to an embodiment, defining interfaces allows the SCEF to access services or capabilities at either a new or an existing 3GPP Network Element within 3GPP. The choice of which protocols to specify for such new 3GPP interfaces, e.g., DIAMETER, RESTful APIs, XML over HTTP, etc., may depend upon multiple factors, including but not limited to the needs of the specific interface, ease of exposure of requested information. In addition, individual instances of SCEF may vary depending on what service capabilities are exposed and what API features are supported.

The functionality of the SCEF may include one or more attributes. These may include, for example: (i) authentication and authorization; (ii) ability for the external entities to discover the exposed service capabilities; (iii) policy enforcement; (iv) assurance; (v) accounting; (vi) accounting traffic documentation; (vii) accessing issues related to external interconnection and point of contact; (viii) abstraction. Specifically, authentication and authorization includes identification of the API consumer, profile management and ACL (access control list) management.

The policy enforcement introduced above includes infrastructural policy, business policy and application layer policy. Infrastructural policy includes policies to protect platforms and network. This may, for example, include ensuring that a service node such as SMS-SC is not overloaded. Business policies are related to the specific functionalities that are exposed. This may, for example, include number portability, service routing, subscriber content, etc. Further, the application layer policies are primarily focused on message payload or throughput provided by an application. This may, for example, include throttling.

The assurance attribute may include integration with O&M systems. In addition, the assurance attribute may include assurance processes related to usage of APIs.

Abstraction involves hiding the underlying 3GPP network interfaces and protocols to allow full network integration. The following functions may be supported: (i) underlying protocol connectivity, routing and traffic control; (ii) mapping specific APIs onto appropriate network interfaces; and (iii) protocol translation. Abstraction may be applied in cases where the required functionality is not natively provided by 3GPP network.

Separately, the SCEF includes Network APIs which are defined by OMA/GSMA for various services. These services may include, but are not limited to, SMS, MMS, Location, Payment, Third Party Call, Multimedia Conference Call and other IMS based services, etc. A list of OMA Network API is available at 'OMA API Inventory,' 3GPP TS 23.401 *General Packet Radio Service (GPRS) Enhancements for Evolved Universal Terrestrial Radio Access Network* (E-UTRAN) Access. For any new service capability exposure, FFS is employed for the work split between 3GPP and OMA/GSMA/other standards bodies for defining new Network APIs and related exposure functionalities.

Further, applications operating in the trust domain may utilize only a subset of functionalities, such as for example, authentication and authorization, provided by the SCEF. Applications operating in the trust domain may also access network entities, such as for example, PCRF, wherever the required 3GPP interface(s) are made available. This may directly be accessed without the need to go through the SCEF.

Figure 5:
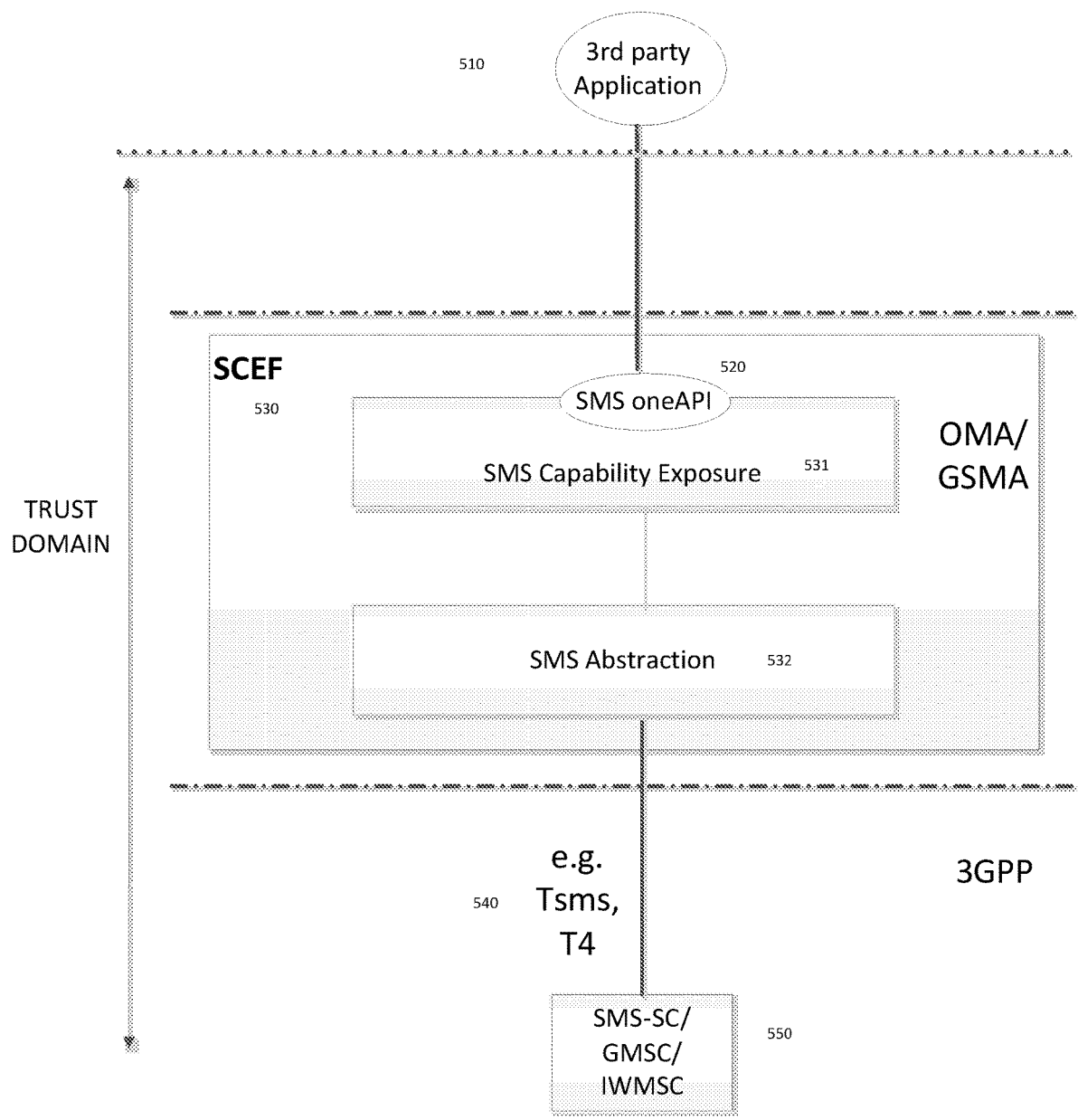
FIG. 5 illustrates a SMS service capability exposure according to the application.

An example illustrated in FIG. 5 depicts a SMS service capability exposure. Specifically, a third party application 510 uses the SMS oneAPI 520 for sending and receiving SMS messages. The SMS capability Exposure 531, located in the SCEF 530 provides a homogeneous interface to all applications. The SMS abstraction 532, also located in the SCEF 530, supports different SMS messaging transport protocols such as SMPP, UCP, etc. The SMS Abstraction 532 will manage and control all network sessions, including load control and message windowing, to each SMSC it connects with. The SMS Abstraction 532 maps the specific API to the T4 and Tsms interfaces 540 towards the SMS-SC/GMSC/IWMSC 550.

SA2 GROUP Based Enhancements (GROUPE) TR

Group enhancements are described in 3GPP TR 23.769 *Group Based Enhancements*, and incorporated by reference it its entirety herein. Generally, applications involve a group of devices, with each group involving hundreds or thousands of devices. Machine type communication (MTC) devices can host multiple applications with each application involving different group of devices. The devices that belong to a group are referred to as 'group members.' Group membership can be static or can evolve dynamically, with group members being added and/or removed during the lifetime of a group. The SCS/AS can create new groups with associated group members, and can remove existing groups.

Different types of groups may exist, including but not limited to, those that have a relatively static membership and those that have more dynamic memberships. Some group operations require that core network nodes, e.g., the HSS or MME, be aware of the membership of UEs in the group. For example, the membership may include group-based APN congestion, roaming status of all members of a group, and counting of devices belonging to a group in a given area. This solution uses maintenance of the group membership at the HSS, and so will be more applicable to groups that have a relatively static membership and require that the HSS and other core network nodes be aware of the group membership.

In addition, SCS/AS specific groups are identified by External-Group-IDs. The External-IDs of the 3GPP devices that are members of a group are bound to the group's External-Group-ID. Both, static and dynamic binding of group members to External-Group-ID can be supported. A 3GPP device can host multiple applications, and the identity of a 3GPP device can be bound to more than one External-Group-ID. This allows SCEF services to: (i) determine the Internal-Group-ID and the Internal-IDs of group members based on an External-Group-ID and optional External-IDs provided by the SCS/AS, (ii) request that the HSS add or remove an Internal-ID from a group that the HSS maintains.

Figure 6:
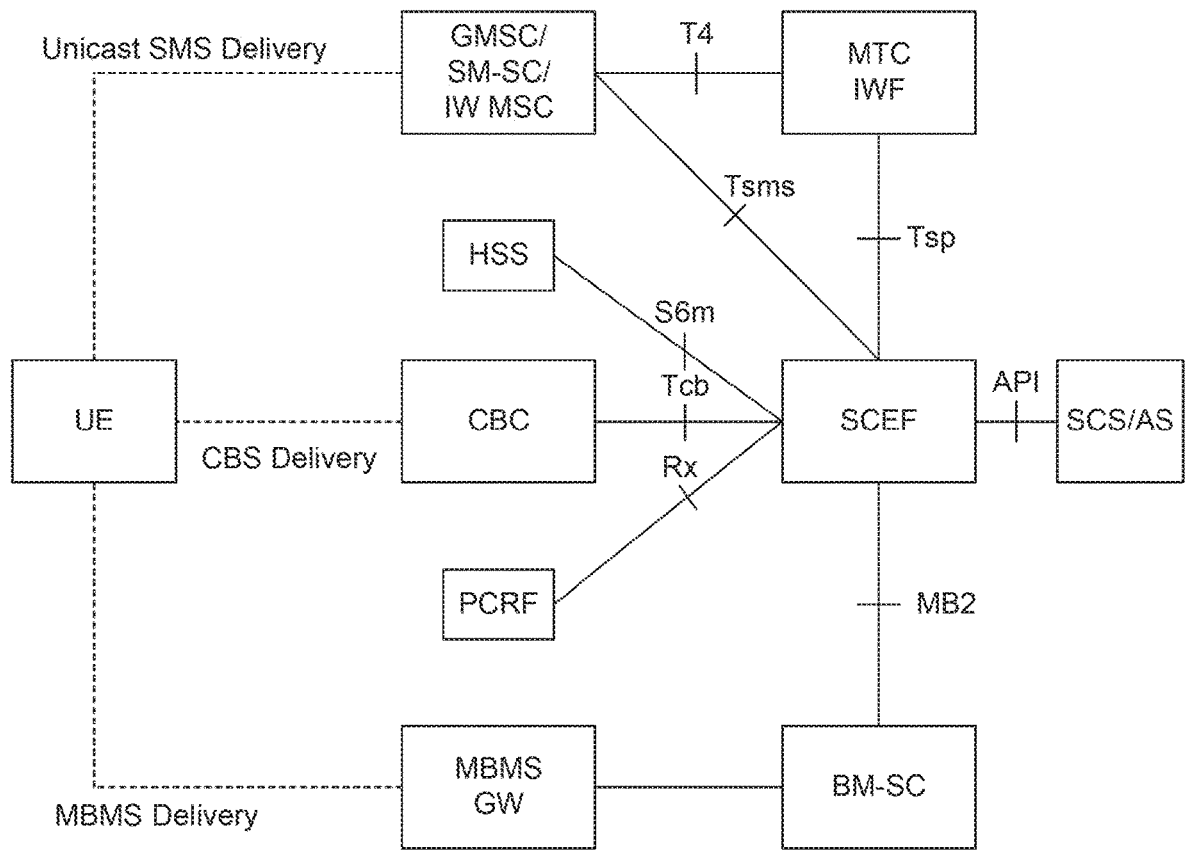
FIG. 6 illustrates architecture for group-based addressing by a SCS/AS and identification of group members according to an embodiment of the application.

FIG. 6 illustrates a high level architecture where a SCEF may contain internal functionality related to a group of users, e.g., a Group Management Function (GMF). Through this internal function, the SCEF can maintain a local copy of the binding of the Internal-IDs, e.g., IMSI, and External-IDs, e.g., MSISDN, of group members with the group's Internal-Group-ID and External-Group-ID and other information needed for the delivery of group services. For example, for a PLMN that supports MBMS, the SCEF's 650 internal GMF can maintain the TMGIs allocated to the groups. Mapping of External-Group-IDs to Internal-Group-IDs, and location information of the group members can also be maintained at the GMF, if needed.

Figure 7:
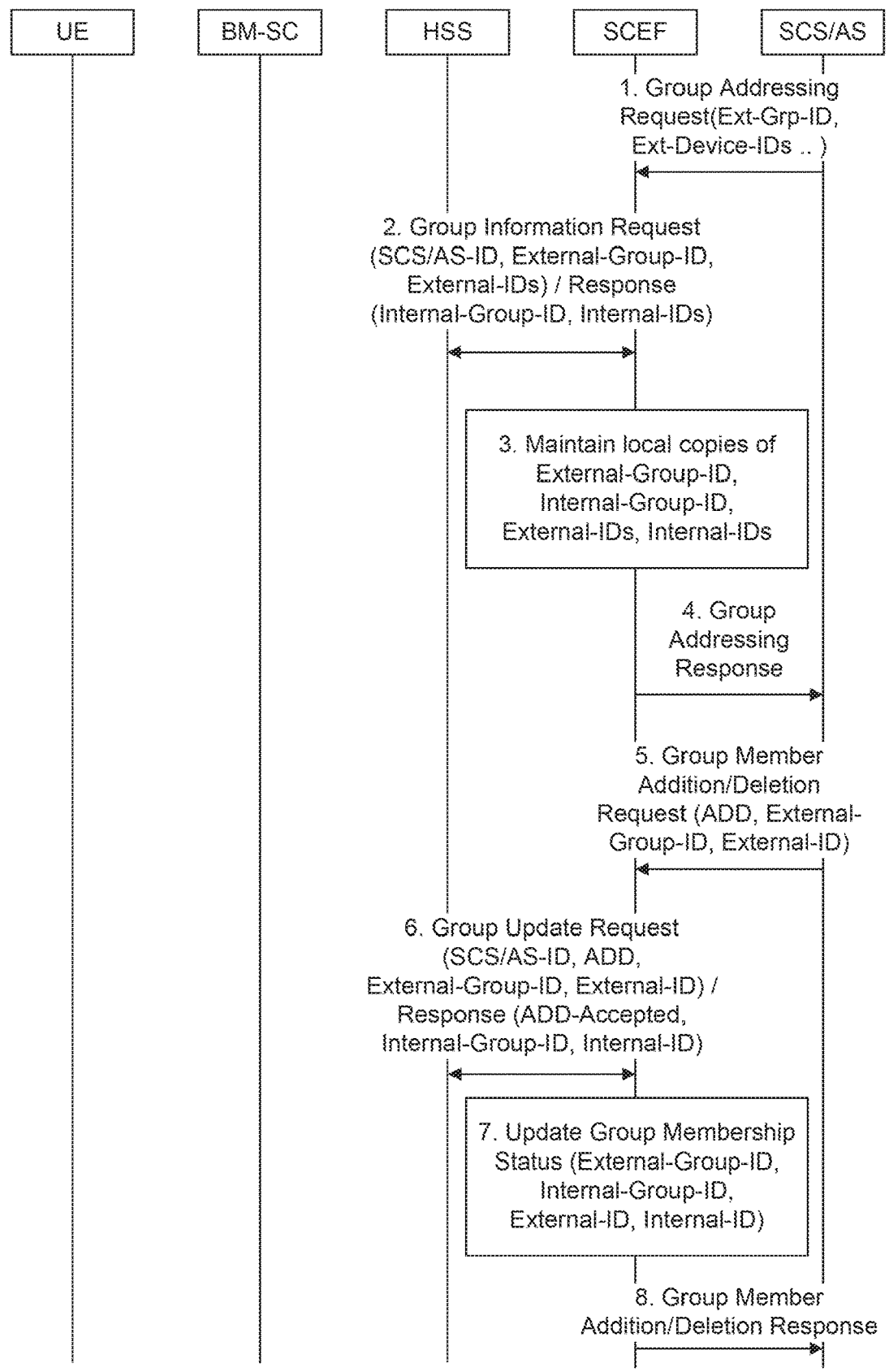
FIG. 7 illustrates a protocol for group-based addressing and identification of group members according to an embodiment of the application.

FIG. 7 illustrates the protocols for group-based addressing and identification of group members. In this illustration, the SCEF includes an internal GMF. Each of the steps is denoted by a Roman numeral. According to step 1, the SCS/AS requests support from the SCEF for an application specific group by sending a Group Addressing Request message. The message includes the External-Group-ID and may include the External-IDs of the devices (UEs) that are members of the external group. In step 2, the SCEF exchanges Group Information Request/Response messages with the HSS to determine if the SCS/AS is authorized to send a Group Information Request for the External-Group-ID. The HSS maps any received group member External-IDs to Internal-IDs. The External-Group-ID is mapped to Internal-Group-ID. The HSS returns the Internal-Group-ID and the Internal-IDs to the SCEF, including the mapping of External-IDs to Internal-IDs, if External-IDs were submitted in the Group Information Request.

According to step 3, the SCEF, using its internal GMF, can maintain a local copy of the mapping of External-Group-ID with information such as group member Internal-IDs, and Internal-Group-ID associated with the group members. In one example, a local copy of the information may be maintained to reduce the impact on core network nodes from frequent queries likely to return similar information already known to the SCEF. Next, the SCEF confirms to the SCS/AS with a Group Addressing Response message (step 4).

According to steps 5-8, the building blocks are provided for the SCS/AS to request that a group member be added or deleted from an internal group maintained by the HSS. In step 5, the SCS/AS sends a Group Member Addition/Deletion Request to the SCEF to have an additional External-ID added to an External-Group-ID. In step 6, the SCEF exchanges Group Update Request/Response messages with the HSS to determine if the SCS/AS is authorized to send a group membership request. The HSS maps the External-Group-ID to the Internal-Group-ID and maps the External-ID to the Internal-ID. The HSS updates the subscription record for the device, adding it to the identified internal group. Subsequently, the local copy of the Group membership information at the SCEF can be updated (step 7). Finally, the SCEF confirms the group addition to the SCS/AS with a Group Member Addition/Deletion Response message (step 8).

The protocols in FIG. 7 above may have some impacts on existing nodes and functionality. For example, at the SCEF, there are different support messages from the SCS/AS as identified in the procedure flows. The SCEF interacts with the HSS for managing Group membership and Group Member status information. Further the SCEF maintains mappings between the group identifier and device group membership.

Figure 8:
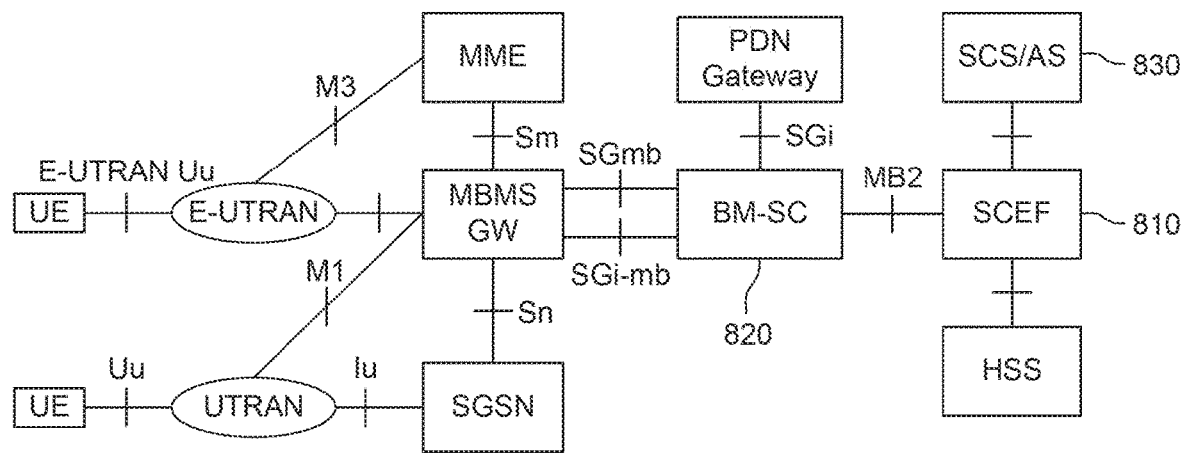
FIG. 8 illustrates a MBMS-based group messaging architecture according to an embodiment of the application.

At the HSS, there may be impacts to support interactions with the SCEF for providing information such as mapping of External-IDs to Internal-IDs, mapping External-Group-IDs to Internal-Group-IDs. There may also be impacts for modifying internal group membership. As for the UE, there are generally no impacts other than the Application Layer specific functionality MBMS Message Delivery Solution This application, in one or more embodiments, describes architecture that may be re-used for general group message delivery purposes. In one embodiment, the BM-SC allocates a TMGI for a specific MBMS user service. It is desired in certain applications that eMBMS supports only broadcast mode. It is also desired in some applications that eMBMS for EPS only supports E-UTRAN and UTRAN. FIG. 8 illustrates one aspect of the group message delivery architecture. The SCEF 810 is connected to the BM-SC 820. SCS/AS 830 provides the content to be broadcasted and additional information to the SCEF 810. As shown in FIG. 8, SCEF 810 and BM-SC 820 are not co-located, rather, an MB2 interface is located there between.

According to one embodiment, the SCEF supports the group messaging functionality in one of many ways. For example, the SCEF supports reception of a group message delivery request from SCS/AS. This may include one or more of the following: TMGI, radio frequency, geographic area of delivery, delivery schedule, group-message content. SCEF may also support the ability to authorize control plane requests from an SCS/AS. SCEF also supports interrogation of the appropriate HSS. This may include determining whether a SCS/AS is allowed to send a group messaging request to a particular group, and to ask for a TMGI allocation. The SCEF may also support reporting to the SCS/AS the acceptance or non-acceptance of the group message delivery request, protocol translation, and forwarding towards the BM-SC of the Activate MBMS Bearer Request.

In addition, the SCEF may also obtain the TMGI and frequency of the MBMS bearer from the BM-SC if the TMGI and frequency are not provided by the SCS/AS. Otherwise, the SCEF may use the TMGI that was provided by the SCS/AS in the group message delivery request. The SCEF may also support generation of group messaging specific CDRs including group External Identifier and SCS Identifier and forwarding to CDF/CGF over instance of Rf/Ga. The SCEF may also support triggering the session start procedure based on the service areas and the RAT(s). The SCEF may also send the content to the BM-SC on the MB2-U interface at the scheduled time if the SCS/AS provides the group message content in the group message delivery request.

The SCEF may also handle requests from UEs for the TMGI, radio frequency, content description, and transmission schedule if requested by the SCS/AS in the group message delivery request. In a further aspect, having the SCEF handle requests from the UEs for the TMGI, radio frequency, content description, and transmission schedule provides a means to insulate the SCS/AS from the details of delivery of content via MBMS. This means the SCEF must have an identity, e.g., FQDN, known to the UEs. In an exemplary embodiment, delivery of large messages is provided to devices that are not power-constrained. It is expected that power-constrained devices can be pre-configured with the TMGI, frequency, content description, transmission schedule, and any decryption keys needed to receive and understand the group message content.

The SCEF may also support reception of the TMGI allocation request from the SCS/AS. Moreover, the SCEF may support forwarding the TMGI allocation request to the BM-SC. Further, the SCEF may support reception of the TMGI allocation request from the BM-SC and forwarding the TMGI to the SCS/AS.

Figure 9:
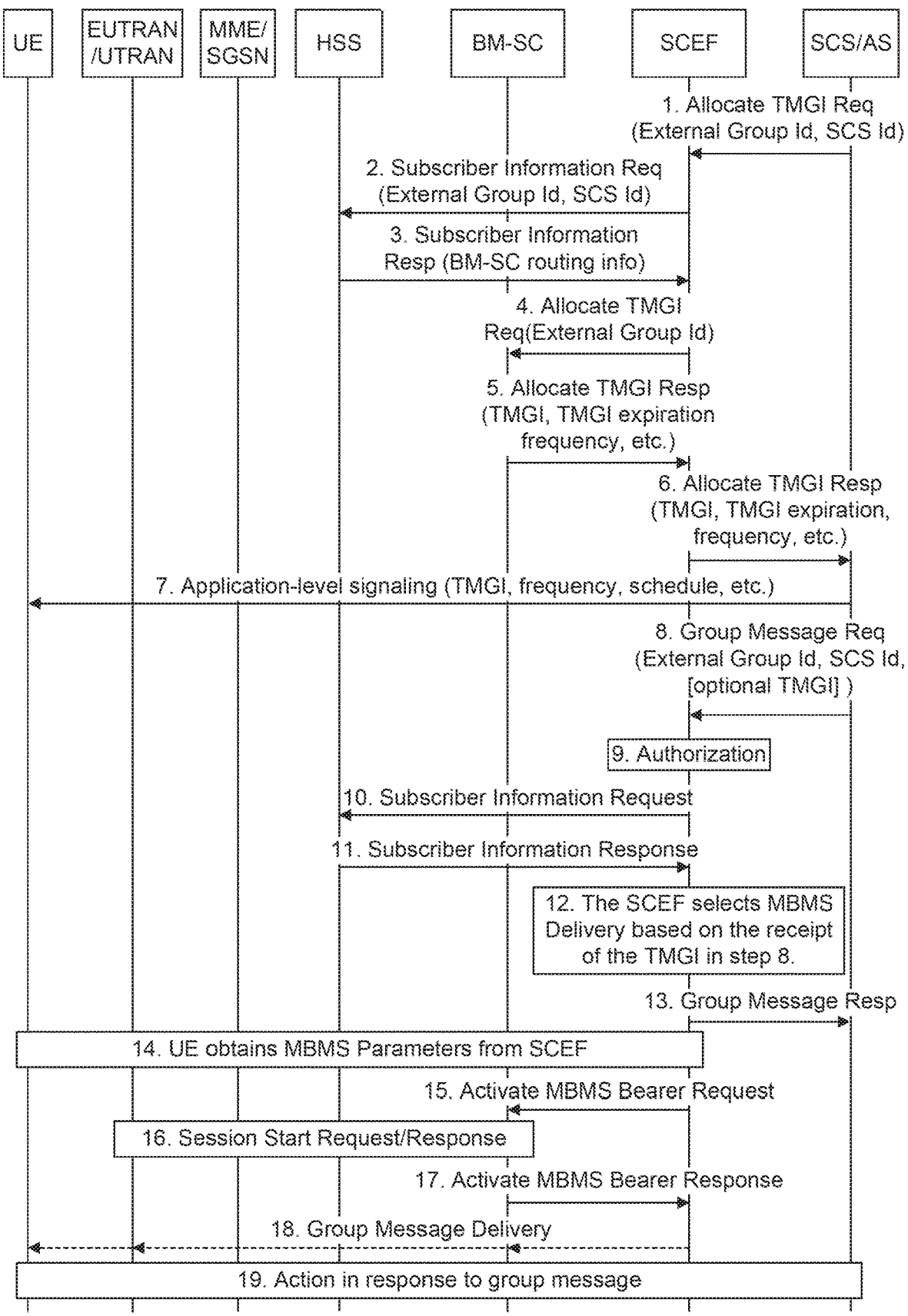
FIG. 9 illustrates a protocol for MBMS-based group messaging according to an embodiment of the application.

FIG. 9 illustrates an allocation of a TMGI by the SCS/AS and the use of MBMS to deliver a message to a group of UEs. Each of the steps is denoted by a Roman numeral. In this case, an operator may treat the trigger/messaging as a normal MBMS user service and use the "service announcement" (SMS, WAP, HTTP) as defined in TS 23.246 to distribute the related service information to the devices of specific groups before message delivery. This approach, shown for example in optional steps 1-7 of FIG. 9, may also be applied for the devices of a specific group to provide them with the related MBMS service information.

According to step 1, if there is no assigned TMGI for an External Group Id, the SCS/AS sends the Allocate TMGI Request (External Group Id, SCS Id) message to the SCEF. The SCEF checks that the SCS/AS is authorized to request TMGI allocation. In step 2, the SCEF sends the Subscriber Information Request (External Group Id and SCS Id) message to the HSS to determine if the SCS/AS is authorized to request TMGI allocation for the group and to retrieve the related HSS stored "Routing information" including the identity of the BM-SC. In step 3, the HSS sends the Subscriber Information Response ("Routing information" including the BM-SC's identity) message.

Next, the SCEF sends the Allocate TMGI Request (External Group Id) to the BM-SC based on the information received from HSS (step 4). The BM-SC allocates a TMGI and determines an expiration time for the TMGI. Then, the BM-SC sends the Allocate TMGI Response (TMGI, TMGI expiration, frequency, etc.) message to the SCEF (step 5). In step 6, the SCEF forwards the received TMGI, TMGI expiration, frequency, etc., to the SCS/AS. Subsequently, the SCS/AS signals the TMGI, frequency, schedule, etc. to all UEs belonging to the group (step 7).

Thereafter, the SCS/AS sends the group messaging request (External Group Identifier, SCS Identifier, application layer content of the group message, location/area information, RAT(s) information, TMGI) message to the SCEF (step 8). The SCS/AS may determine the IP address(es)/port(s) of the SCEF by performing a DNS query using the External Group Identifier or using a locally configured SCEF identifier/address. The location/area information indicated by the SCS/AS may be the geographic area information.

Subsequently, in step 9, the SCEF checks that the SCS/AS is authorized to send a group messaging request. The SCEF may send a Subscriber Information Request (External Group Identifier and SCS Identifier) message to the HSS/HLR to determine if SCS/AS is authorized to send group messaging to the specific group (step 10). Thereafter, the HSS/HLR sends the Subscriber Information Response (Delivery Method(s), cause) message. HSS/HLR may indicate the group messaging delivery method, e.g., MBMS, based on the subscription and/or policy (step 11). If the cause value indicates the SCS/AS is not allowed to send a group messaging request to this group, or there is no valid subscription information, the SCEF sends a group messaging Confirm message with a cause value indicating the reason for the failure condition and the flow stops at this step. Otherwise this flow continues with step 5.

According to step 12, the SCEF selects MBMS delivery based on the receipt of the TMGI in step 8. The SCEF sends a Group Messaging Confirm message to the SCS/AS to confirm that the Request has been accepted for delivery to the UE (step 13). If configured to do so, the UE obtains the MBMS bearer parameters from the SCEF, e.g., using a known address such as an FQDN for the SCEF (step 14). This may occur a significant period of time prior to the actual broadcast transmission of the group content.

Next, if MBMS delivery method is selected, SCEF sends an Activate MBMS Bearer Request (MBMS service Area, TMGI) message to the BM-SC/MBMS-GW. MBMS-GW performs the session start procedure with MME/SGSN (step 15). Then, the MBMS-GW performs the session start procedure with MME/SGSN (step 16). Then, the BM-SC sends an Activate MBMS Bearer Response to the SCEF (step 17). Here, the SCEF maps between location/area information provided by the SCS/AS and the MBMS service area for the distribution of the group message based on configuration in the operator domain. Moreover, the SCEF is aware that the selected MBMS service area(s) may result in broadcast of the message over an area larger than the area that may be indicated by SCS/AS. This is because the MBMS broadcast at the cell granularity level is not supported.

In step 18, the SCEF transfers the group message content to the BM-SC/MBMS-GW. The group message content is delivered to the UE. In response to the received message, the UE takes specific actions that take into consideration the content of the payload (step 19). This response typically involves initiation of immediate or later communication with the SCS/AS.

The SCEF supports the group messaging functionality. For example, the SCEF supports reception of a group messaging request from SCS/AS. The SCEF also supports the ability to authorize control plane requests from an SCS/AS. The SCEF also supports reporting to the SCS/AS the acceptance or non-acceptance of the group messaging request. The SCEF also supports providing the TMGI and radio frequency to the SCS/AS if requested to do so. The SCEF also supports interrogation of the appropriate HSS to, for example, determine if a SCS/AS is allowed to send a group messaging request to a particular group, and to ask for a TMGI allocation, or provide the TMGI, radio frequency, content description, and transmission schedule to UEs.

The SCEF may also support protocol translation, and forwarding towards the BM-SC/MBMS-GW of a group messaging request. The SCEF may also support generation of group specific messaging CDRs including group External Identifier and SCS Identifier and forwarding to CDF/CGF over instance of Rf/Ga. The SCEF may also support triggering the session start procedure based on the service areas and the RAT(s). The SCEF may also support reception of the TMGI allocation request from the SCS/AS and forwarding the request to the BM-SC. The SCEF further supports reception of the TMGI from the BM-SC and forwarding the TMGI to the SCS/AS.

Adding Group Members

Figure 10:
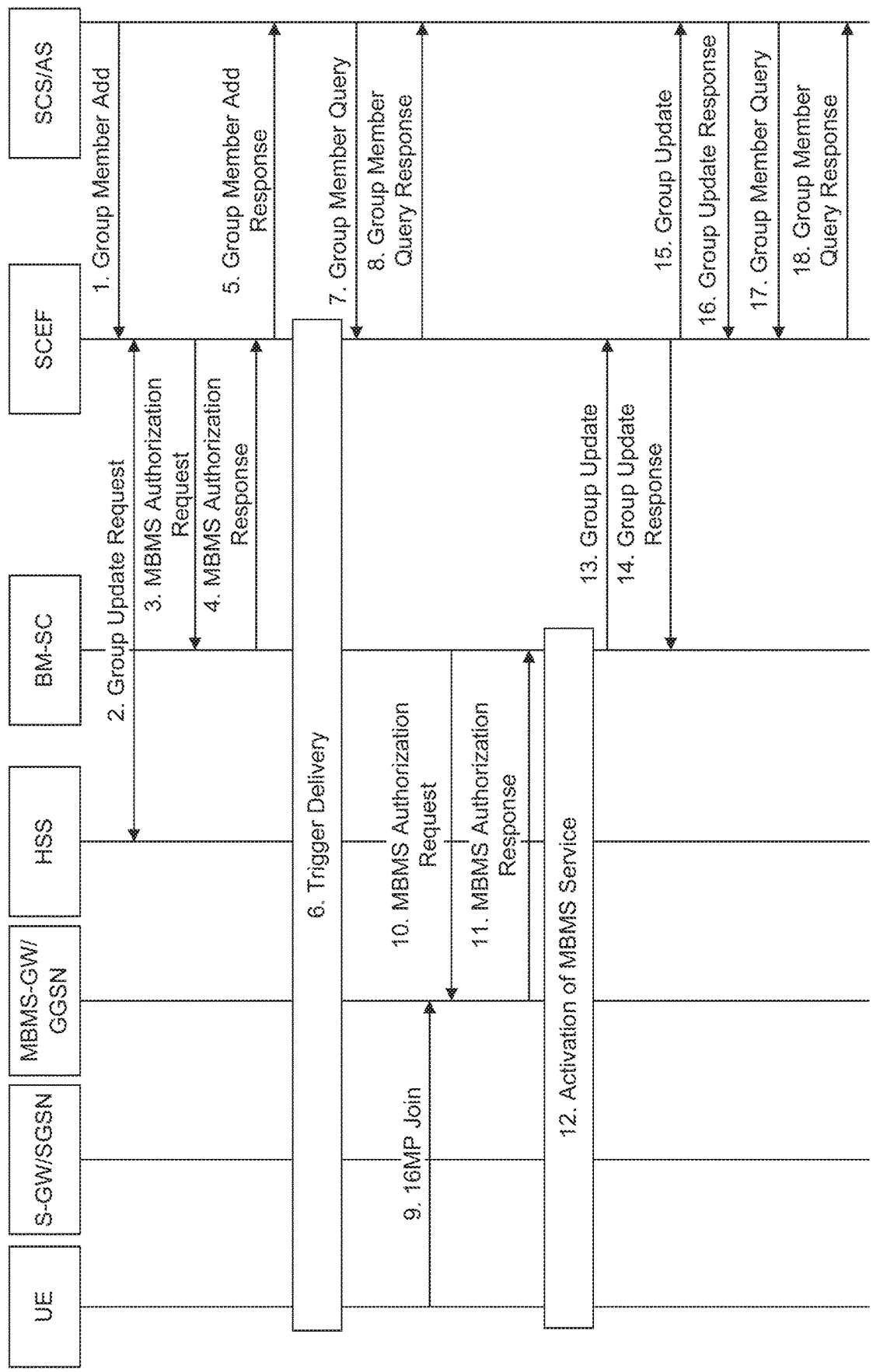
FIG. 10 illustrates a protocol for updating group membership according to an embodiment of the application.

According to a further aspect of the application, FIG. 10 illustrates a group membership update procedure. The procedure has several advantages over existing procedures. For example, the new procedure allows the SCEF to track which devices are authorized to be in the group and what devices have joined the group, e.g., listening. A SCS/AS may indicate that a device should join the group and ask that the device be authorized to join the group. When this happens, the SCEF and BM-SC will record that the device is allowed to be in group. When the SCS/AS queries the SCEF to see which devices are in the group, the SCEF will distinguish between what devices have been authorized to join the group and what devices have activated the MBMS Service or are listening for the group message. By so doing, the SCS/AS may send messages at opportunistic times.

In an exemplary embodiment, the procedure set forth in FIG. 10 hides all of the underlying network details from the SCS/AS. The SCS/AS does not need to contact the UE and provide the UE with the multicast address and other MBMS UE Context. Instead, a trigger message from the SCEF will be sent to the UE and the trigger payload will carry enough of the MBMS UE Context information to allow the UE to activate the service. For example, the trigger payload may carry a TMGI, APN, group name, or multicast address. When the device actually joins the group, e.g., activates the service, the BM-SC will inform the SCEF so it will know that the device is actually listening for the group messages. In turn, the SCEF will notify the SCS/AS. Alternatively, the SCEF may notify the SCS/AS at predetermined periods of time rather than on demand. The SCS/AS may take advantage of this feature by waiting to send a group message until certain devices are listening for the group message or until a certain number, or percentage, of the group is listening for the group message.

Each of the steps in FIG. 10 is denoted by a Roman numeral. According to this aspect of the application, the core network may include one or more of the BM-SC, HSS, MBMS-GW/GGSN, and S-GW/SGSN. The core network may also be referred to as the mobile network operator. In accordance with this embodiment, the SCEF may reside in one of the following locations discussed below. For example, the SCEF may be located on a stand-alone node. The stand-alone node may be owned by a service provider. Alternatively, the stand alone node may be owned by someone with a relationship to the service provider. In another example, the SCEF may be located on the server, such as for example, the SCS/AS. In yet even another example, the SCEF may be located on a node that is owned by the mobile network operator.

According to step 1 as depicted in FIG. 10, the SCS/AS sends a message to the SCEF to add specific device(s) to a group. The group can be a pre-established group. Alternatively, this can be a new group. The group is identified by external-group-id. The device(s) to be added are identified by an external-id. According to one embodiment, the SCS/AS may indicate that it wants to be notified when a UE activates the MBMS service. This message may be used to add multiple UEs to the group.

According to an embodiment, when the SCS/AS creates a group, modifies a group, or requests that a message be delivered to a group, it can indicate to the SCEF what percentage of the group should be listening before the message is sent. The SCEF could either buffer, or hold, the message until the required number of group members are listening to the multicast. Once the SCEF receives a notification from the BM-SC that more member(s) have joined the group, the SCEF may determine, based upon the message from the SCS/AS, that enough group members are listening to deliver the message. The SCEF then sends the message.

According to another embodiment, a time limit could be provided to the SCEF by the SCS/AS. This time limit may be an indication to the SCEF that the message should be delivered after a certain amount of time, regardless of how many group members are listening to the multicast.

In step 2, the SCEF exchanges Group Information Request/Response messages from the SCS/AS with the HSS to determine if the SCS/AS is authorized to send a Group Information Request for the External-Group-ID. In one embodiment, the HSS authorizes that the SCS/AS is permitted to add members to the group or delete members from the group, maps the external group identifier to the internal group identifier, and updates the device's subscription to indicate that it is authorized to be member of the group. The request from the SCEF may indicate that MBMS may be used for group message delivery. In an exemplary embodiment, the response from the HSS may indicate the APN should be used for group message delivery. The UE receiving the MBMS message will use this APN to send an IGMP Join to active the service.

According to step 3, the SCEF sends the MBMS Authorization Request to the BM-SC to check that the UE is authorized to receive MBMS data. This message is sent on the MB2 reference point. The MB2 reference point is described, for example, in 3GPP TS 23.468. In one embodiment, the request may include the APN that was received from the HSS and the internal device identifier(s). In another embodiment, the request may also include an indication that the SCEF wants to be notified when a new device activates the MBMS Service. In step 4, a response is received from the BM-SC on whether the device is authorized to receive the MBMS data. In one embodiment, the BM-SC or SCEF, via its service announcement function may employ protocols to initiate a service announcement for the MBMS Service. These protocols may include, for example, WAP PUSH, HTTP, SMS, and SMS-CB. Here, the SCEF may indicate to the BM-SC if service announcement is required.

According to step 5, the SCEF confirms that the device is authorized to be added to the group. In one embodiment, the message to the SCS/AS only indicates that the UE is authorized. In another embodiment, the message in step 5 includes an indication that the device has joined the group.

According to step 6, a trigger or other mechanism is employed to send group details to a UE via the core network. Specifically, the SCEF sends an indication to the UE that it should join the multicast group. The trigger will be sent to a well-known port number that the UE is expected to listen to for multicast group invitations. Alternatively, the port number that the trigger is sent to could have been provided by the SCS/AS. This may have occurred in step 1 above. In one embodiment, the trigger payload may carry one or more of the following information types: APN, Multicast Address, and SCS-ID.

Figure 11:
FIG. 11 illustrates a graphical user interface of user equipment in regard to FIG. 10 according to an embodiment of the application.

According to an embodiment as shown in FIG. 11, for example, the trigger may show up on a graphical user interface 1100 on a display of the UE. The display is described and illustrated above in FIGS. 1C and 1D. Specifically, the message which appears on the graphical user interface 1100 states, "You have a received a request to join a Multicast/Broadcast Group from M2M Server XYZ. Do you want to join?" The message may also indicate which server sent the invitation. The message may also request the user's permission to join or listen to the Multicast/Broacast. If the user selects "Yes," the user joins as discussed below in more detail in step 9.

Next, the SCS/AS may send a group member query to the SCEF (step 7). The request indicates an external-group-id. The group member query may occur at any time in the process of FIG. 10. It is described herein as occurring subsequent to the trigger delivery. In step 8, the SCEF returns a list of devices that have been authorized to join the group. In an exemplary embodiment, the SCEF may also provide a list of devices that have activated the MBMS service. As shown in FIG. 10, the device that was authorized in step 5 has not activated the MBMS Service. These steps will be discussed below in more detail. Thus, the message to the SCS/AS would indicate that the device is authorized, but not yet listening to the multicast.

According to step 9, the UE processes the trigger described above according to step 6 and checks with its internal protocols regarding whether it wants to listen to multicast messages indicating by the SCS-ID ultimately received from the AS/SCS. The UE establishes a default bearer in the APN that was indicated in the trigger. This presumes that an APN connection did not already exist. The UE then sends an IGMP/MLD Join request to the Multicast Address. That is, the UE is requesting to join the group and actively listen to multicast messages from the SCA/AS or SCEF.

Then, the MBMS-GW or GGSN sends an MBMS Authorization Request to the BM-SC (step 10). The BM-SC then responds to the MBMS Authorization request (step 11). The MBMS Service is activated with the UE (step 12). These procedures are described, for example, in 3GPP TS 23.246 *Multimedia Broadcast/Multicast Service; architecture and Functional Description.*

In step 13, the BM-SC informs the SCEF that the device has activated the MBMS Service. This is a new message on the MB2 reference point. In one embodiment, the BM-SC may know to send this message because of the indication that was included in the message from the server to the SCEF according to step 1 and an indication from the SCEF to the BM-SC according to Step 3. In step 14, the SCEF acknowledges the notification from the BM-SC. Steps 13 and 14 may also be used to inform the SCEF when a UE has deactivated its MBMS bearers. This information would be used by the SCEF to update the UE's status within the group to be authorized, but deactivated and not listening. This may occur as a result of the following events. One event may include, for example, when the BM-SC has chosen to terminate the MBMS service. The BM-SC will notify the SCEF that a UE, or group, is no longer listening after, or before, sending a "Session Stop Request" or "De-registration Request" to the GGSN or MBMS-GW. Another event may include, for example, when a UE decides to stop listening to a multicast. At this time the UE will typically send an IGMP Leave message. This will cause the GGSN or MBMS-GW to send a "Leave Indication" to the BM-SC. The "Leave Indication" will cause the BM-SC to notify the SCEF that the UE is no longer listening.

According to step 15 in one embodiment, if the notification was requested in step 1, the SCEF informs the SCS/AS that the device has activated the MBMS Service. In step 16, the SCS/AS acknowledges the notification from the SCEF. Subsequently, the SCS/AS sends a group member query to the SCEF. The request indicates an external-group-id (step 17). It is noted that this optional message can be used as an alternative to sending the SCS/AS a notification every time a group member activates the MBMS Service. According to step 18, the SCEF returns a list of devices that have been authorized to join the group. The list may also, in a further embodiment, include a list of devices that activated the MBMS Service. Steps 17 and 18 are similar in scope to step 7 and 8 described above. According to FIG. 10, the device that was authorized in step 5 has now activated the MBMS service. That is, the message to SCS/AS will indicate that the device is authorized and is listening to the multicast.

According to another embodiment, after step 16 and after step 18, the SCS/AS may have some assurance that the device is listening to the multicast. The SCS/AS may use this information to help decide when it should begin to send multicast data to the group via the SCEF.

According to another embodiment, if the UE sends the 'IGMP Proxy join' before the SCS/AS requests that the UE be added to the group, the BM-SC will not authorize the MBMS service activation for the UE. In this case, the BM-SC may send a request to the SCEF indicating that a UE wishes to join the group. The SCEF may send a request to the SCS/AS that controls the group to see if the UE should be allowed to join the group. The SCS/AS may respond to the SCEF with an indication of whether or not the UE is permitted to join the group. In turn, the SCEF may respond to the BM-SC with an indication of whether the UE is permitted to join the group. The BM-SC may use the indication to decide if the UE should be authorized for the MBMS service.

According to yet another embodiment, the UE may have an application that receives the trigger shown in step 6 of FIG. 10. This may be a well-known port reserved that the UE will be listening to for MBMS advertisements. When the application receives the trigger request, it may use the contents of the trigger payload to open a connection to the APN, construct an IGMP join message and then send the IGMP/MLD join message. The APN, multicast address, and multicast source address may be obtained from the trigger payload. In an alternative embodiment, the UE application may obtain an application identifier from the trigger payload and pass the APN, multicast address, and multicast source address to a second application. The second application may then generate the IGMP/MLD join message. The IGMP join operation may be an IPMulticastListen as described in IETF RFC 3376, *Internet Group Management Protocol Version* 3, and is incorporated by reference in its entirety. In addition, the MLD join operation may be an IPv6MulticastListen as described in IETF RFC 3810, *Multicast Listener Discovery Version* 2, (MLDv2) for IPv6, and is incorporated by reference in its entirety.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device or UE, M2M gateway device, or a stand-alone node including a SCEF, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 3 and 7-10. The computer executable instructions may be stored in a memory and executed by a processor disclosed above in FIGS. 1C and 1D, and employed in devices including UEs, SCEFs, SCSs/ASs, and the core network. In one embodiment, a computer-implemented SCEF having a non-transitory memory and processor operably coupled thereto, as described above in FIGS. 1C and 1D, is disclosed. Specifically, the non-transitory memory has instructions stored thereon for allocating control and coordination of membership to a group receiving a multicast message. The processor is configured to perform the instructions of: (i) receiving a request from a server to add a device to the group; (ii) sending a reply to the server that the device is authorized to join the group; (iii) receiving a notification that the device has joined the group; (iv) receiving a query request from the server; (v) checking the status of the device based on the query request; and (vi) providing the server with an indication that the device has joined the group.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus on a network, the apparatus comprising:
  a non-transitory memory including executable instructions for configuring membership of a group; and
  a processor operably coupled to the memory, the processor configured to:
    receive a request from a network node to add a device to the group;
    send a reply to the network node that the device is authorized to join the group; and
    deliver a message to the device when a predetermined condition is met,
    wherein a device status is selected from joined, active, authorized, and combinations thereof, and
    wherein the predetermined condition is selected from a percentage or number of devices in the group are listening, a set time has elapsed, and combinations thereof.

2. The apparatus of claim 1, wherein the processor is further configured to:
  receive the status of the device, via a core network, that the device is active.

3. The apparatus of claim 1, wherein the processor is further configured to:
  send a trigger to the device to join the group, the trigger including information selected from an access point name, multicast address, group name, TMGI, SCS-ID and combinations thereof.

4. The apparatus of claim 1, wherein the processor is further configured to:
  receive a query request from the network node, the query request including all devices authorized to join the group; and
  check a status of the device based on the query request.

5. A system comprising:
  a network node;
  an apparatus in communication with the network node, the apparatus including:
    a non-transitory memory including executable instructions for configuring membership of a group, and
    a processor operably coupled to the memory, the processor configured to:
      receive a request from a network node to add a device to the group;
      send a reply to the network node that the device is authorized to join the group; and
      deliver a message to the device when a predetermined condition is met,
    wherein a device status is selected from joined, active, authorized, and combinations thereof, and
    wherein the predetermined condition is selected from a percentage or number of devices in the group are listening, a set time has elapsed, and combinations thereof.

6. The system of claim 5, wherein the processor is further configured to send the status of the device to the network node.

7. The system of claim 5, wherein the system includes a service capability exposure function.

8. The system of claim 5, wherein a core network includes one or more of a broadcast multimedia service center, a MBMS gateway, gateway GPRS support node, home subscriber server, serving gateway, packet data network gateway and serving GPRS support node.

9. The system of claim 5, wherein the processor is further configured to:
  receive a query request from the server, the query request including all devices authorized to join the group; and
  check a status of the device based on the query request.

10. A method for configuring membership of a group comprising:
  receiving a request from a network node to add a device to the group;
  sending a reply to the network node that the device is authorized to join the group;
  sending a status of the device to the network node; and
  delivering a message to the device when a predetermined condition is met,
  wherein the status of the device is selected from joined, active, authorized, and combinations thereof, and
  wherein the predetermined condition is selected from a percentage or number of devices in the group are listening, a set time has elapsed, and combinations thereof.

11. The method of claim 10, wherein the method further comprising:
  receiving a query request from the server, query request including all devices authorized to join the group; and
  checking a status of the device based on the query request.

12. The method of claim 10, further comprising:
  receiving the status, via a core network, that the device is active.

13. The method of claim 10, further comprising:
sending a trigger to the device to join the group,
wherein the trigger includes information selected from an access point name, multicast address, group name, TMGI, SCS-ID and combinations thereof.

\* \* \* \* \*